June 25, 1935.  R. A. COFFMAN  2,005,913
MOTOR AND MOTIVE SYSTEM
Filed May 11, 1931  13 Sheets-Sheet 1

INVENTOR
Roscoe A. Coffman,
by Byrnes, Stebbins, Parmelee & Blenko
his attys.

June 25, 1935.    R. A. COFFMAN    2,005,913
MOTOR AND MOTIVE SYSTEM
Filed May 11, 1931    13 Sheets-Sheet 2

INVENTOR
Roscoe A. Coffman,

June 25, 1935.  R. A. COFFMAN  2,005,913
MOTOR AND MOTIVE SYSTEM
Filed May 11, 1931   13 Sheets-Sheet 3
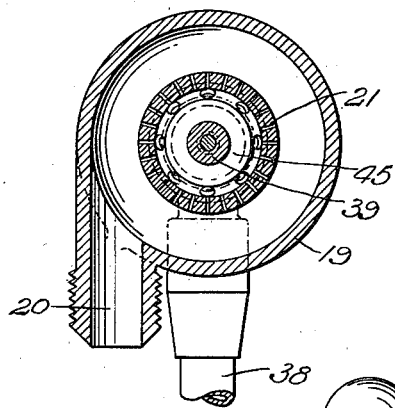
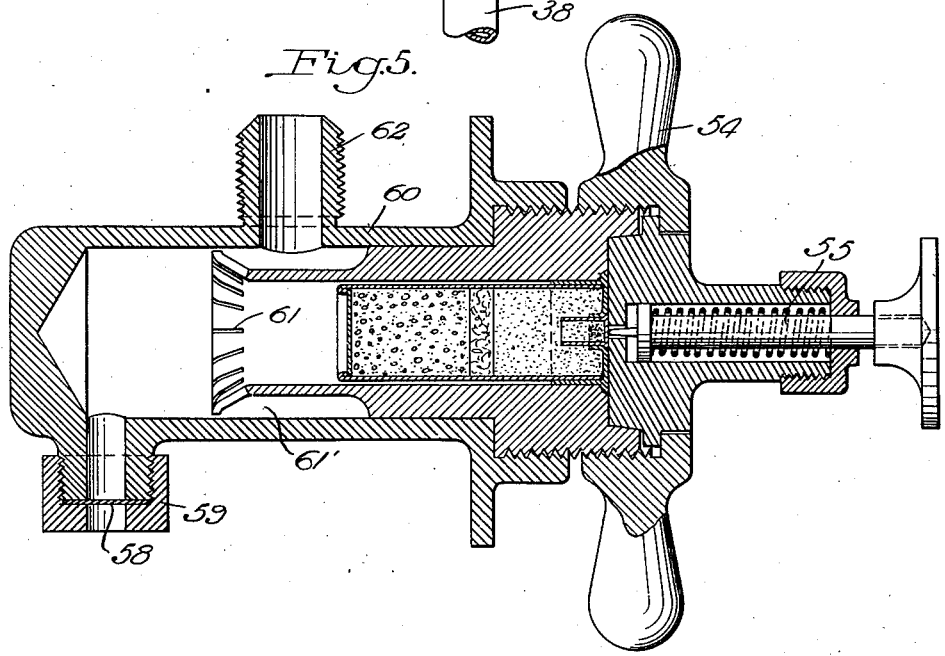
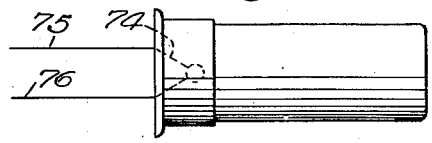
INVENTOR
Rosuve A. Coffman,
his attys.

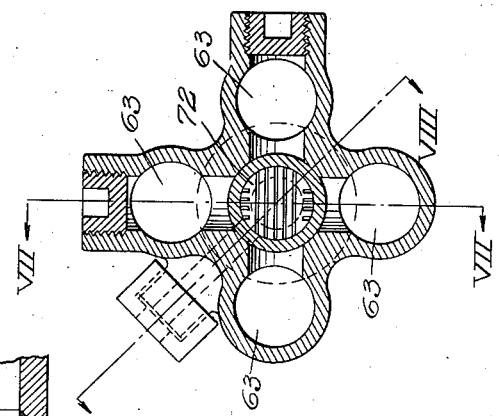
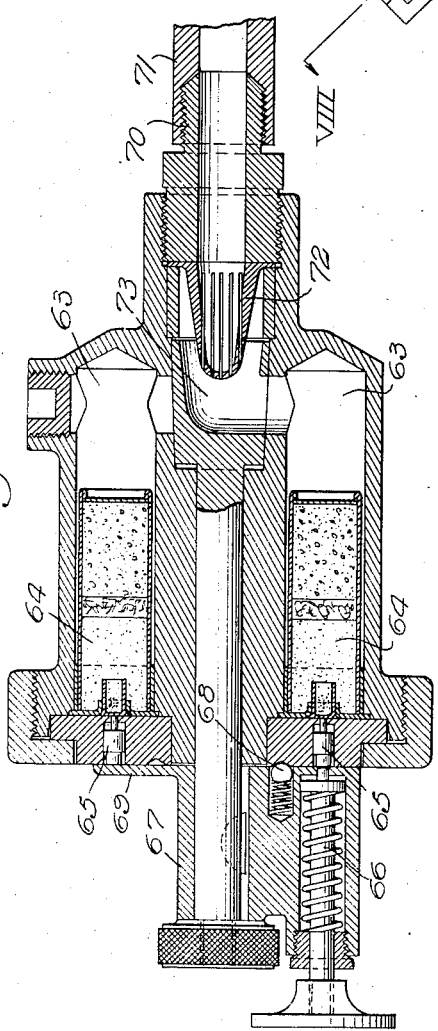
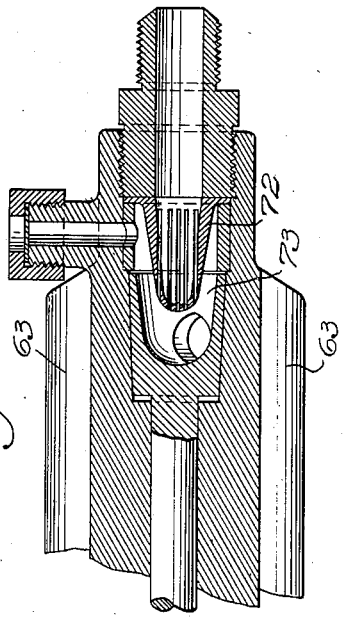

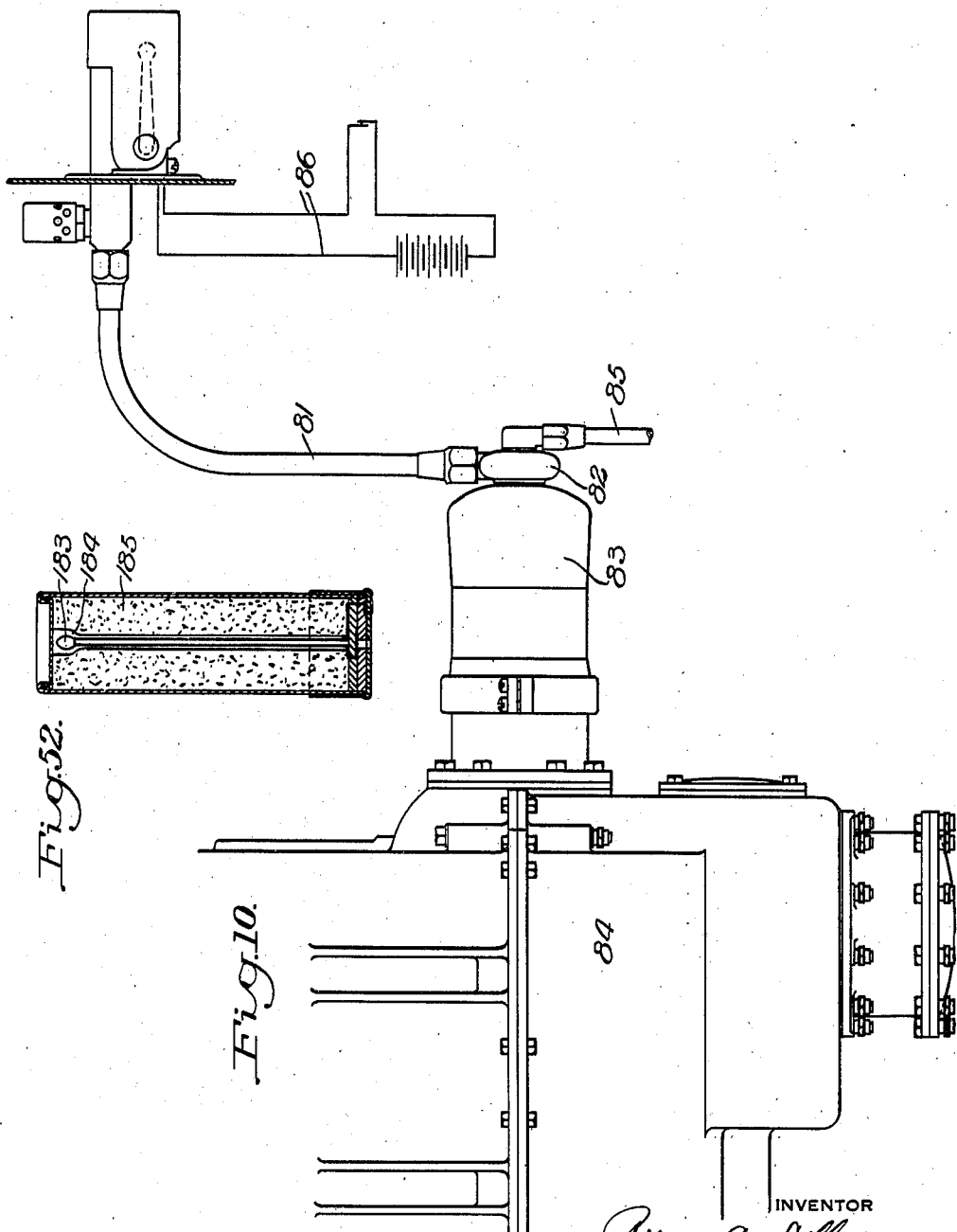

June 25, 1935.  R. A. COFFMAN  2,005,913
MOTOR AND MOTIVE SYSTEM
Filed May 11, 1931    13 Sheets-Sheet 6

INVENTOR

June 25, 1935.  R. A. COFFMAN  2,005,913
MOTOR AND MOTIVE SYSTEM
Filed May 11, 1931   13 Sheets-Sheet 7
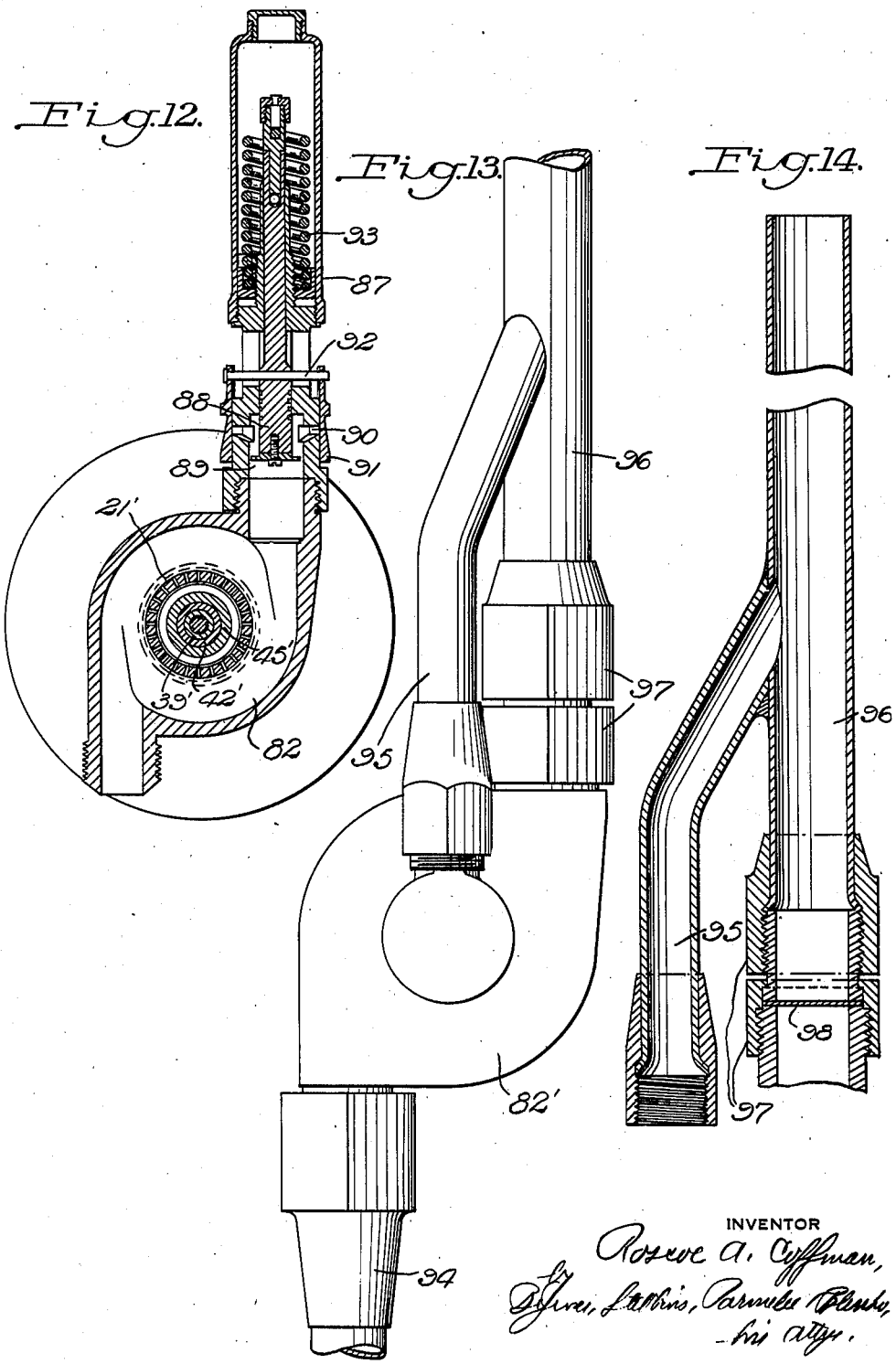
INVENTOR
Roscoe A. Coffman, June 25, 1935.  R. A. COFFMAN  2,005,913
MOTOR AND MOTIVE SYSTEM
Filed May 11, 1931  13 Sheets-Sheet 9
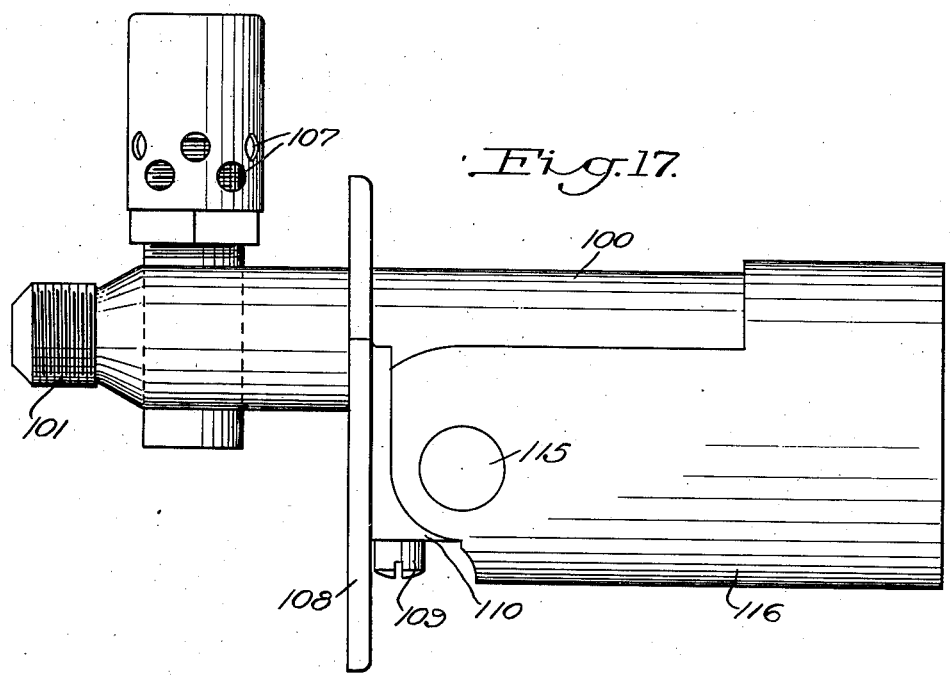
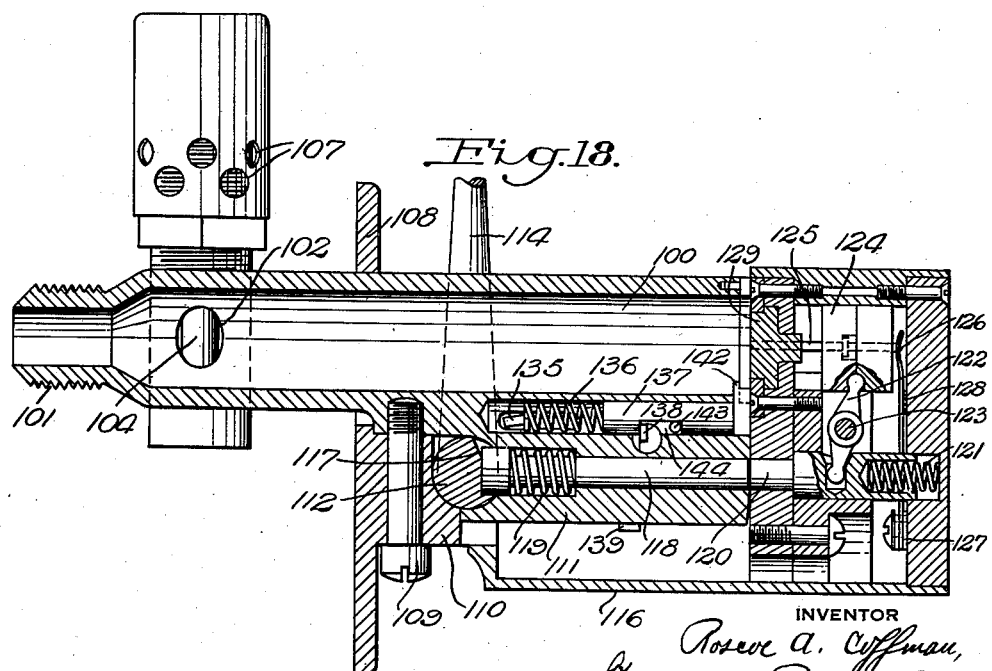

June 25, 1935.　　　R. A. COFFMAN　　　2,005,913
MOTOR AND MOTIVE SYSTEM
Filed May 11, 1931　　　13 Sheets-Sheet 10
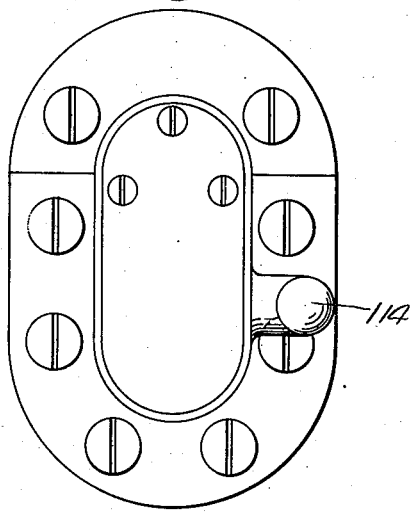
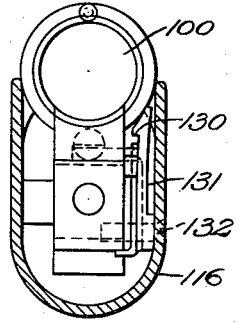
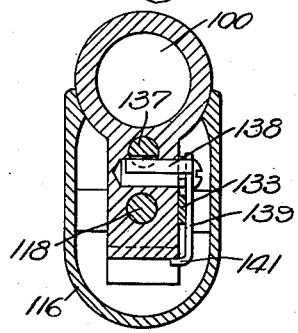
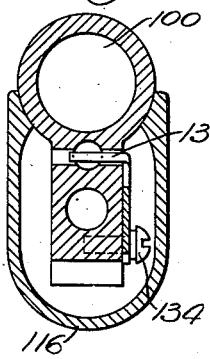
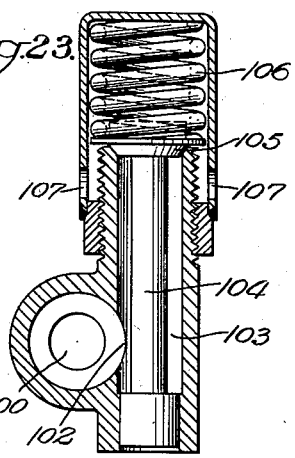
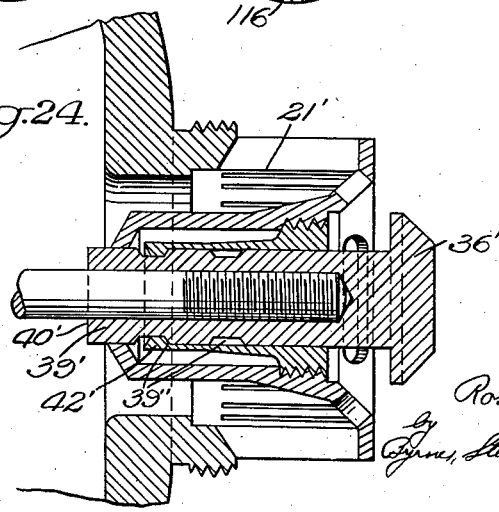

June 25, 1935.  R. A. COFFMAN  2,005,913
MOTOR AND MOTIVE SYSTEM
Filed May 11, 1931    13 Sheets-Sheet 11
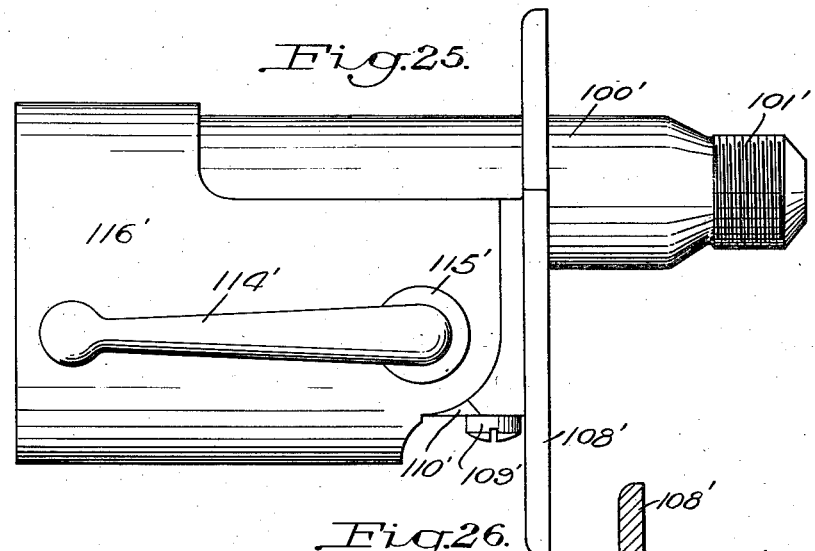
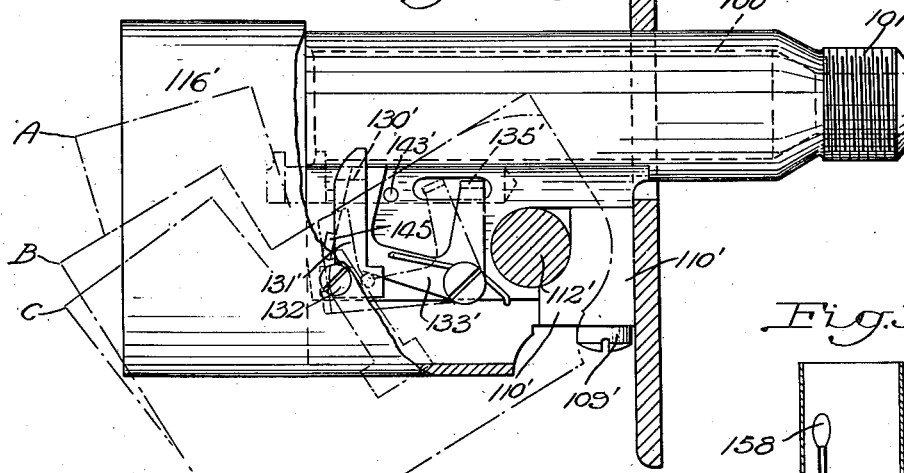
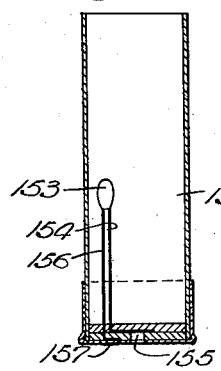
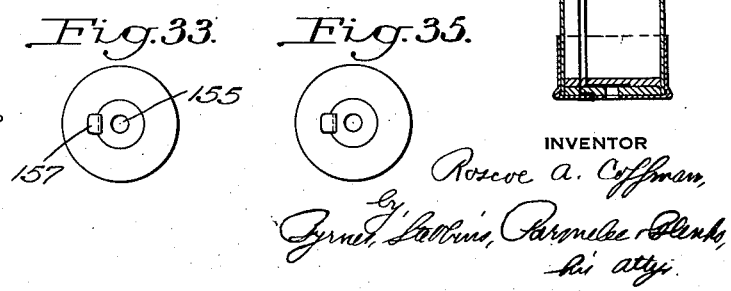
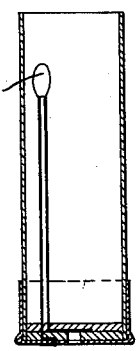
INVENTOR
Roscoe A. Coffman June 25, 1935.  R. A. COFFMAN  2,005,913
MOTOR AND MOTIVE SYSTEM
Filed May 11, 1931   13 Sheets-Sheet 12
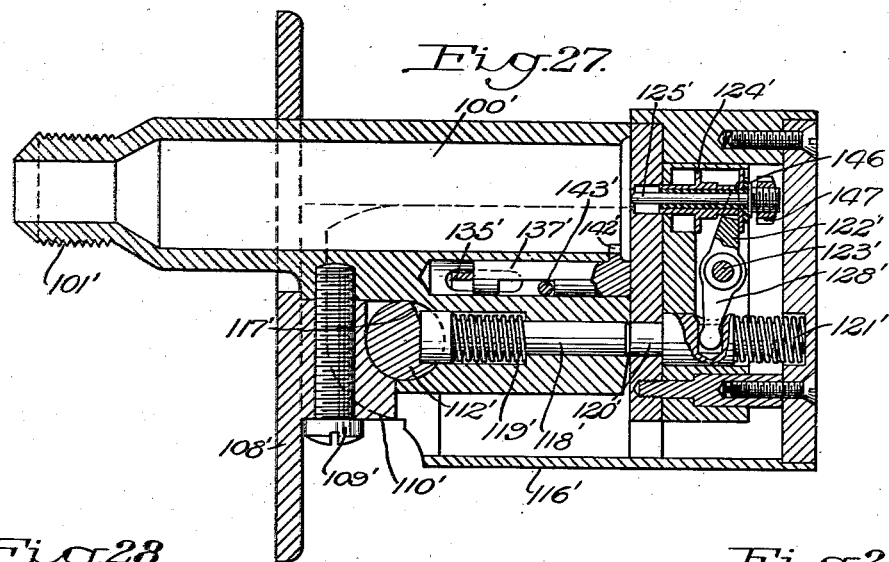
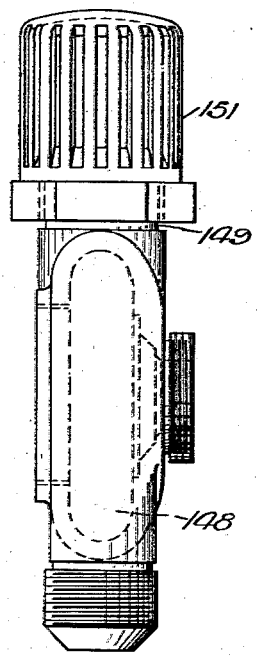
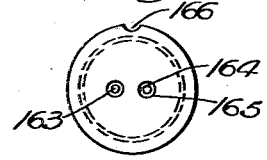
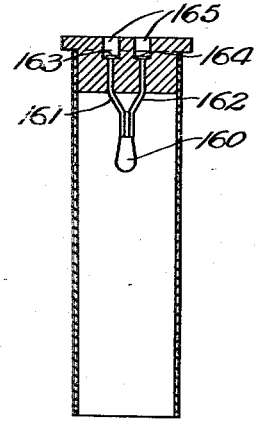
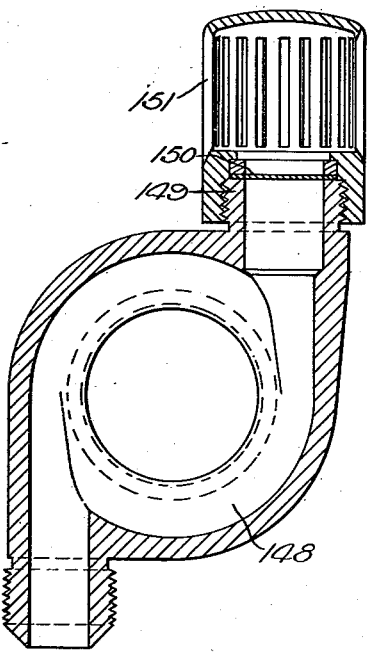
INVENTOR
Roscoe A. Coffman, June 25, 1935.   R. A. COFFMAN   2,005,913
MOTOR AND MOTIVE SYSTEM
Filed May 11, 1931    13 Sheets-Sheet 13
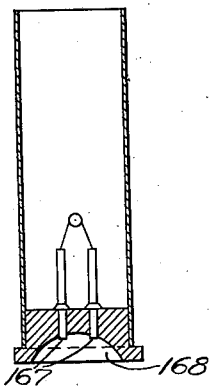
Fig.36.
Fig.37.
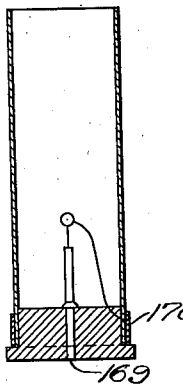
Fig.38.
Fig.39.
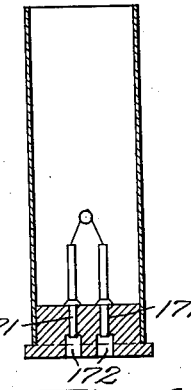
Fig.40.
Fig.41.
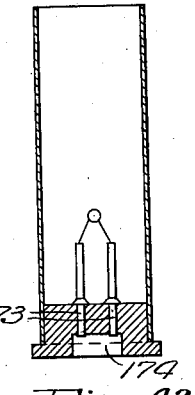
Fig.42.
Fig.43.
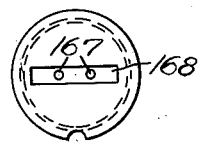
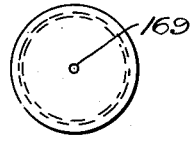
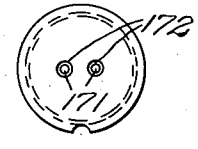
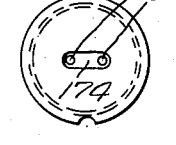
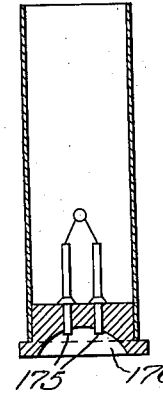
Fig.44.
Fig.45.
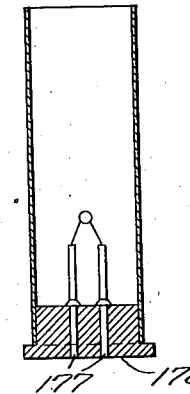
Fig.46.
Fig.47.
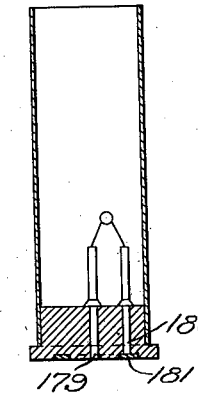
Fig.48.
Fig.49.
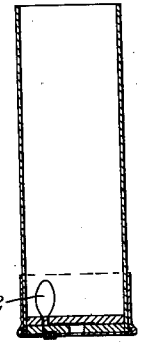
Fig.50.
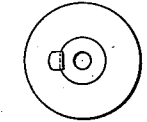
Fig.51.
INVENTOR
Roscoe A. Coffman,
his attys.

Patented June 25, 1935

2,005,913

UNITED STATES PATENT OFFICE 2,005,913

MOTOR AND MOTIVE SYSTEM

Roscoe A. Coffman, Pittsburgh, Pa.

Application May 11, 1931, Serial No. 536,389
In Canada August 1, 1930

12 Claims. (Cl. 60—44)

The present invention relates broadly to motive devices and more particularly to a combination including an improved motive device of the fluid pressure type and a system associated therewith effective under predetermined conditions for delivering to the motive device fluid pressure in such amount as to produce an actuation thereof.

While it is contemplated in accordance with the present invention that the improved motive device itself may be utilized directly as a prime mover, it is particularly useful as a starting motor for internal combustion engines, and more especially engines of the character utilized for aviation purposes. Where so used it is essential that the starting motor be capable of developing the required torque for effecting rotation of the internal combustion engine quickly and efficiently. These attributes of operation must be obtained with a motor having a minimum weight and of extremely compact construction. In accordance with the present invention there is provided a motor satisfying requirements of the character set forth, and at the same time sufficiently powerful to itself serve as a prime mover under conditions requiring a limited amount of rotative movement.

In combination with the motor there is provided a motive system including means for producing operating pressure for the motor. This last mentioned means preferably, although not necessarily, consists of a combustible solid fuel containing sufficient oxygen to support its own combustion with a minimum of residual ash. Such material may be varied to obtain the proper balance of power necessary to perform the proposed work operation, which will vary under extremes of temperature and other conditions. By employing a fuel of this nature and burning the major portion of the charge in close proximity to the part to be moved, I am able to gradually build up a cushioning body of gases while subjecting them to the heat derived from their own combustion and thereby maintain an undiminished gas pressure for such period of time as is necessary to successfully perform the designated work operation. In accordance with one embodiment of the invention, the system may be of the multiple type including a plurality of means of the character referred to, whereby a series of impulses is made possible in comparatively rapid succession.

Inasmuch as the combustible solid fuel of the above character is responsible for the generation of gas and/or steam under the heat derived from the combustion of said fuel, which gases will upon cooling be converted into a condensate, provision is therefore made for effecting an automatic and complete scavenging of the motor and of the system to thereby preclude the possibility of a moisture content forming and remaining within the motor or system such as would interfere with a succeeding operation. This scavenging operation takes place after both the combustion of the fuel and work operation are completed but while the temperature of the gases is maintained well above the temperature of condensation by the dissipation of the so-called skin heat stored in the surfaces of the metal on the internal part of the system exposed to the higher temperature of the fuel combustion. This feature of the invention is of particular importance when the motive system is of such characteristics that the ignition of part of the fuel is initiated at a point remote to the motor to thereby generate sufficient gas pressure to propel a major portion of the fuel together with ignited particles of fuel through the system to a point closely adjacent the motor itself where the combustion is completed to build up and maintain sufficient pressure for the working operation.

Repeated successful operations are assured by the use of carefully selected fuel comprising a mixture or deck-loading of pellets embodying different ignition and combustion characteristics, and selected according to the predetermined relationship between the total capacity, including the increasing capacity due to the moving part and the rate of pressure increase due to gas formation and superheating. Gases of the general character generated by such fuel are known to have light density and to cool instantly so that it is necessary in order to maintain their expansion and pressure efficiency to subject them to the direct contact of the flames from the burning fuel. Such gases may be said to be superheated and the greatest efficiency is obtained in a system wherein such superheated gases and said flames are in contact at a point immediately adjacent the part to be moved.

That such superheated gases are essential to the operation of my system is shown clearly by my earlier experimentation where I found that gases generated at a point remote to the part to be moved and transferred without superheating to a point adjacent to the part to be moved if they produced pressure sufficient to move the said part would further cool under the expansion permitted by the moving part, and immediately cause the pressure to fall off appreciably, while in my present system when the said part starts to move there is no falling off of pressure but in fact the pressure continues to build up under the expansion permitted by the moving part to the maximum pressure where it is then maintained for a sufficient period of time to insure the completion of the designated working operation.

The primary object of my invention is to provide means whereby such superheating of gases, enables me to maintain maximum pressure of gases at a time when they are subject to the expansion caused by the movement of the part to be moved and to this end, I have provided a burning chamber embodying a screen or grid element to hold back the burning fuel and yet permit of the passage of the hot flame and gases beyond said screen. I have found by experience that when the fuel has passed a determinate distance from the ignition point, that to prevent the breaking up of the fuel pellets upon arrival at the burning chamber and thereby increasing their burning surfaces to generate gas too rapidly instead of building up slowly in order to avoid shock, it is necessary to introduce in the system an annular burning chamber or housing into which the major portion of the fuel enters tangentially and whereby a continuous whirling movement against the outer wall of said chamber is imparted to such portion of the fuel until consumed.

It is further desirable in a motive system of the character referred to, to make provision for the dissipation of pressure in the event of an undue accumulation. The present system therefore further contemplates a safety feature which will become effective for relieving pressure in case the pressure is built up to a point beyond that for which the apparatus is designed.

With charges of fuel of the character referred to, it is desirable further to make provision against the premature opening of the mechanism containing the charge, or the premature igniting, or burning thereof. The invention therefore contemplates a safety device in the form of a breech closure or mechanism for the charge which precludes ignition of the charge until the mechanism is properly assembled.

The invention further contemplates improvements with respect to the manner of supplying the desired pressure to the apparatus. In this respect, due to the facility with which cartridges or shells may be handled, transported and fired, I preferably make use of a shell type of charge, and provide a breech mechanism which will effectively receive such a charge.

Other features of the invention will be apparent and become better understood by reference more particularly to the following specification and drawings.

In the accompanying drawings I have shown for purposes of illustration only, certain preferred embodiments of my invention. In the drawings:

Figure 4 is a transverse sectional view on the line IV—IV of Figure 1;

Figure 5 is a detail sectional view illustrating a slightly different means for producing operating pressure for the motor;

Figure 6 is a view similar to Figure 4 illustrating still another embodiment of the invention;

Figure 7 is a transverse sectional view on the line VII—VII of Figure 6, looking in the direction of the arrows;

Figure 8 is a partial longitudinal sectional view along the line VIII—VIII of Figure 6, looking in the direction of the arrows;

Figure 9 is a detail view illustrating a modified form of means for producing the operating pressure for the motor;

Figure 10 is a diagrammatic elevational view illustrating an embodiment of the invention slightly different from that shown in Figure 1;

Figure 12 is a detail sectional view on the line XII—XII of Figure 11;

Figure 13 is an end elevational view of a slightly modified embodiment of the invention;

Figure 14 is a detail sectional view of a portion of the structure shown in Figure 13;

Figure 17 is a side elevational view of the opposite side of the breech mechanism of Figure 15;

Figure 18 is a longitudinal sectional view through the breech mechanism of Figures 15, 16 and 17.

Figure 19 is an end elevational view of the breech mechanism just referred to;

Figure 20 is a detail sectional view on the line XX—XX of Figure 16, looking in the direction of the arrows;

Figure 21 is a detail sectional view on the line XXI—XXI of Figure 16, looking in the direction of the arrows;

Figure 22 is a detail sectional view on the line XXII—XXII of Figure 16, looking in the direction of the arrows;

Figure 23 is a detail sectional view on the line XXIII—XXIII of Figure 16, looking in the direction of the arrows;

Figure 24 is an enlarged detail sectional view of the exhaust valve for the motor of Figure 11;

Figure 25 is a view similar to Figure 15 illustrating another embodiment of the invention with respect to breech mechanism;

Figure 26 is a view of the breech mechanism of Figure 25 showing certain of the parts broken away and in section;

Figure 27 is a longitudinal sectional view through the breech mechanism of Figures 25 and 26;

Figure 28 is a side elevational view of a modified form of safety release;

Figure 29 is a detail sectional view of the safety release of Figure 28;

Figures 30, 32, 34, 36, 38, 40, 42, 44, 46, 48 and 50 are longitudinal sectional views through different forms of charge holding devices;

Figures 31, 33, 35, 37, 39, 41, 43, 45, 47, 49 and 51 are end elevational views of the charge forming devices just referred to; and Figure 52 is a longitudinal sectional view of a modified form of shell.

Figure 1:
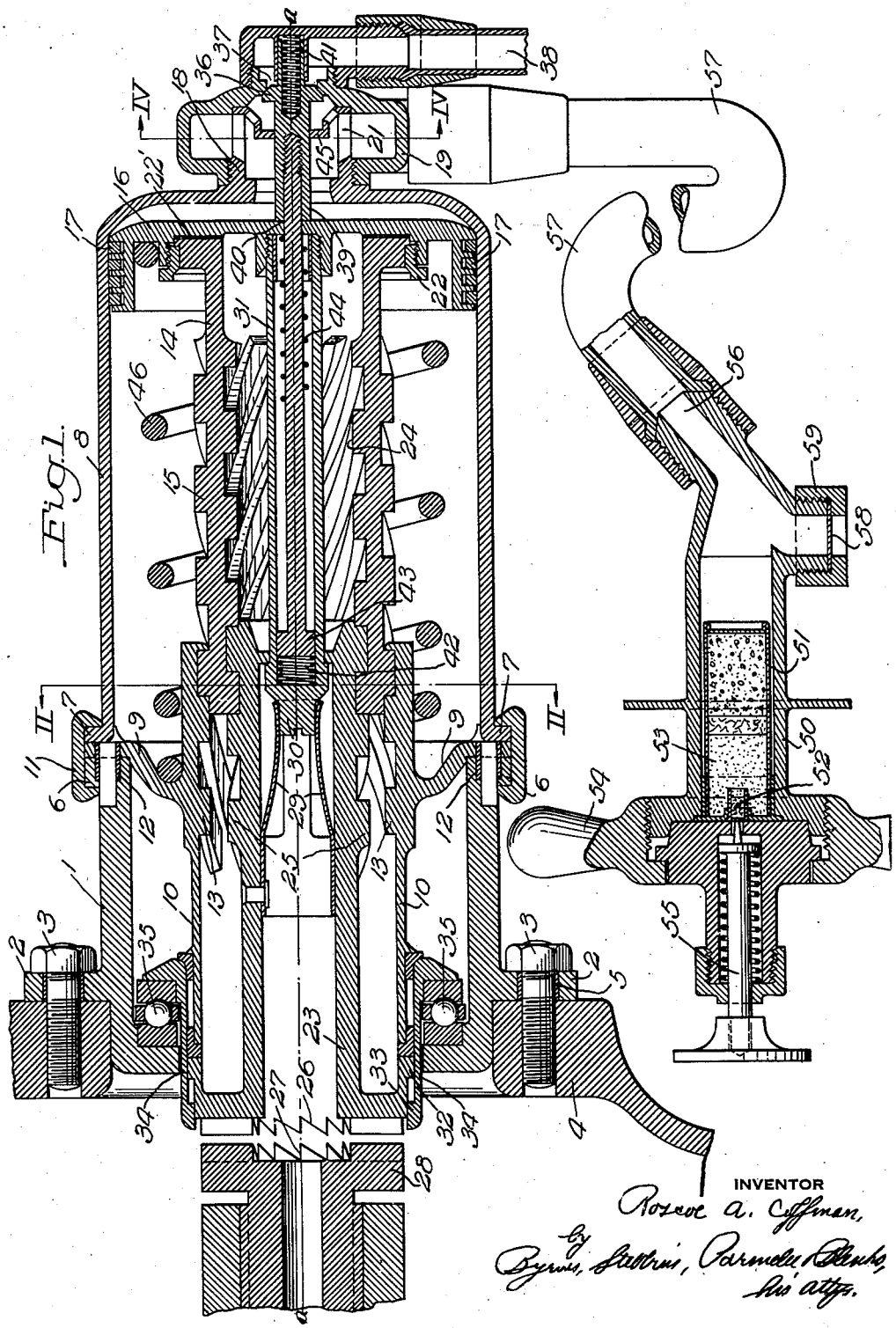
Figure 1 is a longitudinal sectional view through a motor constructed in accordance with the present invention, the motor being illustrated in co-operative relation to a rotative part of an internal combustion engine, and being shown in connection with a system containing means for producing operating pressure for the motor.

In carrying out the present invention, there may be provided a housing 1, of substantially cylindrical shape, having at one end thereof a flange 2 adapted to support the motor in position. Where used as a starting motor for internal combustion engines, this flange will be of such construction as to permit the motor to be bolted or otherwise secured in the desired relationship to such internal combustion engine by means of bolts 3 extending through suitable openings in the flange and projecting into the crank case 4 of the internal combustion engine. In view of the requirements in a device of this character for lightness of construction, the housing 1 is preferably formed of aluminum or other similar material. Due to the characteristics of such material, the openings through which the fastening bolts 3 extend may be reinforced by sleeves 5 of relatively harder material effective for successfully preventing any tendency toward relative rotative movement between the housing and the support to which it is connected.

At its opposite end, the housing is provided with a second flange 6 of relatively smaller dimensions adapted to cooperate indirectly with a similar flange 7 on a cylinder 8. In the preferred embodiment of my invention the cylinder and flange are secured together on opposite sides of an outwardly projecting flange 9 formed on a sleeve 10, the connection being accomplished by a split clamping ring 11 as illustrated particularly in Figures 1 and 2 of the drawings. Extending through the respective flanges 6 and 9 on the housing and sleeve respectively are bushings 12 of a construction generally similar to that of the bushing 5 before described, but serving in addition to the function of tying together the respective flanges against relative rotation, the further function of providing exhaust ports from the interior of the cylinder 8.

The sleeve 10 as herein illustrated projects in opposite directions from the general plane of the flange 9, and is formed on its inner surface with threads or splines 13, having a pitch determined by the duty to be performed by the motor.

Cooperating with the splines 13 is a driving member 14, herein illustrated as being of generally cylindrical shape, and having on its exterior surface threads or splines 15 of the same pitch as those of the parts 13, and adapted for inter-engagement therewith. This inter-engagement is such that upon reciprocation of the driving member 14 to the left, as viewed in Figure 1 of the drawings, it will have imparted thereto a rotative movement about the axis a of the motor.

For effecting the desired reciprocating movement of the driving member 14, there may be provided a piston 16, having suitable packing or packing rings 17, for cooperation with the walls of the cylinder 8 and of such dimensions and type as to provide a minimum of clearance therebetween.

Formed on the head of the cylinder 8 is an externally threaded boss 18 adapted to receive an annular combustion or expansion housing 19, which is preferably threaded thereon. This combustion housing is conveniently of the construction illustrated more particularly in Figure 4 of the drawings, wherein the inlet 20 is shown as extending into the housing generally tangentially thereof. Projecting outwardly from the boss 18 is a series of ribs 21 suitably spaced to provide a grating or grid separating the interior of the housing 19 from the interior of the cylinder in such manner as to permit the passage of fluid pressure consisting of expanded gases and the flames of combustion from the housing 19 for actuating the piston 16 while preventing the passage into the cylinder of foreign material. Upon the accumulation of sufficient pressure within the housing 19, this pressure will be transmitted to the cylinder 8 and will be effective against the piston 16 for imparting a longitudinal motion thereto.

In order to provide a light construction, the cylinder is conveniently of a non-rusting material including the non-corrosive faculty to acid derived from the fuels used most advantageously in the system such as a chrome steel, while the piston 16 is conveniently of a high tensile strength special light weight bronze alloy having high acid resisting qualities. The provision of a suitable packing 17 between these parts gives the desired wearing surface and permits the use of the desired metals in both the cylinder and piston.

As before pointed out, reciprocation of the piston 16 produces corresponding longitudinal movement of the driving member 14. Due, however, to the inter-engagement of the threads or splines 13 and 15, longitudinal movement of the driving member is necessarily accompanied by a rotative movement thereof. If desired, the connection between the driving member and the piston is preferably such as to permit relative rotation therebetween. This may be effected by the use of a ring 22 holding the driving member and piston in the desired assembled relationship, a hard fibre washer 22' affording a bearing surface therebetween.

In order to amplify the rotative movement of the driving member and transmit such amplified rotation to a driven member 23, the driving member is provided on its inner surface with threads or splines 24, similar to those before referred to, and adapted to cooperate with similar threads or splines 25 on the exterior surface of the driven member 23. The threads or splines 24 and 25, however, are preferably of the opposite hand from the threads or splines 13 and 15. By reason of this construction, it will be apparent that the rotation imparted to the driving member upon reciprocation of the piston is amplified, and the amplified rotation transmitted to the driven member 23.

By reason of this rotation amplification, it is possible with a compact motor affording a comparatively short stroke, to impart a considerable rotative movement to the driven member 23, thereby making it available directly as a prime mover or as a starting device for an internal combustion engine. Where used as such a starting device, the driven member may be provided on one end with suitable clutch teeth 26 adapted for engagement with similar means 27 on a part 28, to which rotation is to be imparted. As will be apparent from Figure 1 of the drawings, the relationship of the respective means 26 and 27 is preferably such as to provide clearance therebetween. In order, therefore, to effect inter-engagement of these means, a limited longitudinal movement is required. After such movement to bring the means into engagement, the driven member may be rotated to effect the desired rotation of the engine or other mechanism 28 to be rotated. In order to insure such movement, the driven member 23 has projecting inwardly therefrom a series of spring fingers 29 adapted to cooperate with a head 30 on a sleeve 31 carried by the piston 16 and projecting therefrom concentrically with the driving member 14.

By reason of the contour of the head 30 and its engagement with the springs 29, the initial movement of the piston 16 will be effective through the springs 29, by reason of their resistance against outward movement, to effect a longitudinal movement of the driven member 23 to the extent desired. Thereafter the springs 29 will yield outwardly to an extent sufficient to permit the passage of the head 30 therebetween.

It will be understood that in the initial forward movement of the piston 16, the driven member 23 is not caused to rotate with respect to the driving member 14, but upon the contrary turns slowly with and moves forwardly with said driving member 14 until it encounters the resistance offered by the teeth of the part 28. It is only after this resistance is encountered that relative rotation between the parts 12 and 23 takes place.

In order to transmit the end thrust of the driven member 23 to a suitable bearing, it is conveniently provided with a shoulder 32 adapted, when in its extreme outward position, to engage an inwardly projecting shoulder 33 on a sleeve 34. This sleeve is so shaped as to overlie a suitable thrust bearing 35 within the housing 1, so that with the driven member in its extreme outer position the end thrust is transmitted directly to the housing.

Figure 2:
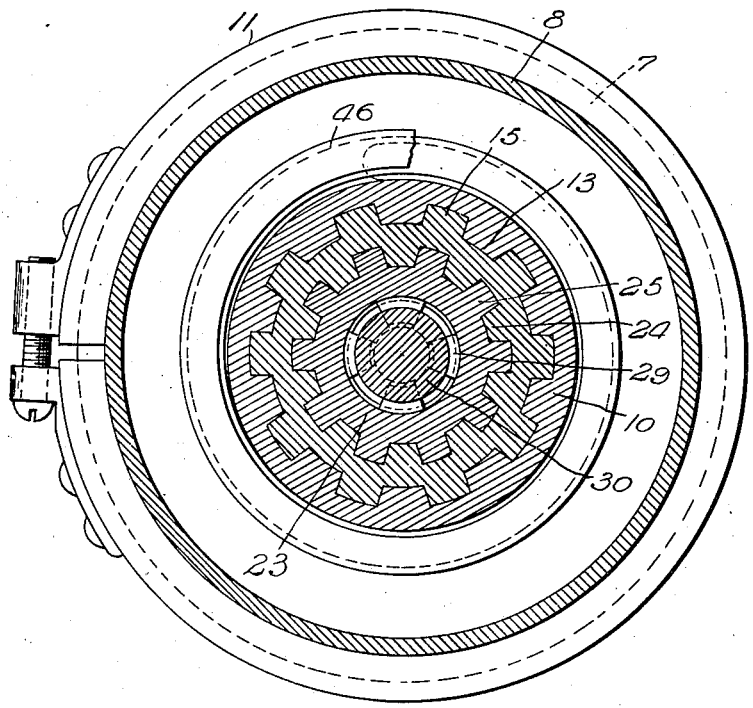
Figure 2 is a transverse sectional view on the line II—II of Figure 1, looking in the direction of the arrows.
Figure 3:
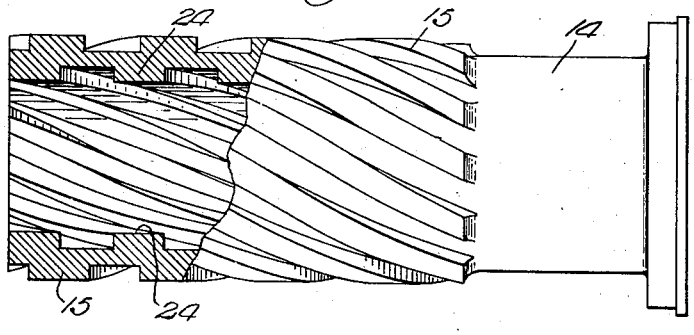
Figure 3 is a view partly in side elevation and partly broken away for the purpose of illustrating the construction of the driving member.

The present invention also preferably includes improved means for automatically controlling the exhaust of the fluid pressure from the cylinder upon completion of each operation. This exhaust control may be effected by providing an exhaust valve 36 adapted to cooperate with an exhaust port 37 conveniently formed in the annular housing 19, and communicating with an exhaust connection 38 leading to any desired point. In the case of an airplane, for example, this exhaust connection will lead to a point exteriorly of the fuselage. The valve 36 is carried by a stem 39 which is of such a length that with the piston in its position as indicated in Figure 1, a shoulder 40 on the stem will bear against the piston whereby the piston mechanism assists in maintaining the exhaust valve tightly against its seat in opposition to a spring 41. This seating is further assisted by means of a second spring 42 within the sleeve 31 and bearing against the sleeve at one end and against an enlarged head 43 on the stem 39 at the other end. At the commencement of an operative cycle of the motor such as occasioned by the delivery of fluid pressure to the chamber 19, this pressure will also tend to maintain the exhaust valve closed even after the piston has commenced its movement.

As the piston reaches the end of its movement, a coil spring 44 within the sleeve 31 and surrounding the stem 39 will be brought into engagement with the head 43 and, when this spring has been compressed to the required extent, will be effective to aid in unseating the exhaust valve. At this time the shoulder 40 on the valve stem will be out of engagement with the piston and the spring 42 will be out of engagement with the head 43. The exhaust valve having been unseated in the manner described, the spring 41 will be effective for holding it in open position, its maximum opening movement being limited by a stop 45 herein illustrated as formed integrally with the screen structure 21 on the boss 18.

The piston having completed its operative stroke, and the exhaust valve having been opened, the piston will be urged on its return stroke by a coil spring 46. During this return movement, the exhaust valve being held open, the cylinder will be effectively scavenged. Due to the action of the spring 41 the valve will remain open until such time as the spring 42 builds up a sufficient pressure against the shoulder 43 on the valve stem for again seating the valve, it being understood that the spring 42 is somewhat heavier than the spring 41. This insures closing movement of the valve at the time the piston has substantially completed its return movement, the closing being cushioned through the action of the spring means which initiates the closing movement. As the piston completes its return movement, it engages the shoulder 40, thus positively holding the valve against opening movement. There is thus provided a motor with automatically controlled exhaust means, which exhaust means is of such construction as to remain open during the major portion of the return stroke of the piston so as to insure substantially complete scavenging.

The means illustrated in Figure 1 for obtaining the desired operating pressure comprises a firing chamber 50 illustrated as containing a cartridge 51 within which is a priming charge 52 and a combustible charge 53. The firing chamber is provided with a cap 54 effective for maintaining a firing pin 55 in position. Upon actuation of the firing pin, the priming charge will be ignited, thereby serving to propel the combustible charge 53 out of the firing chamber through the outlet 56 and tube 57 to the inlet 20 of the expansion or combustion chamber 19. Within this chamber the combustion charge will burn, thereby generating gases which in turn will set up the pressure conditions required. It will be apparent that the screen or grid structure 21 is effective for permitting the passage of a heating flame therethrough for expanding the gases within the cylinder, while preventing the fuel, or any other foreign material within the system, from entering the cylinder itself.

I have illustrated the firing chamber 50 as equipped with a safety device in the form of a rupturable diaphragm 58 adapted to be broken in case the pressure conditions within the system exceed the maximum pressure for which it is designed. This rupturable diaphragm may be detachably held in position by a suitable nut 59 by means of which it can be removed and replaced as may be required.

In Figure 5 there is illustrated a slightly modified embodiment of the invention comprising a firing chamber 60 containing a screen 61 effective for preventing the combustible charge from passing out of the firing chamber through the connection 62 leading to the housing 19. With certain types of charges, or in cases where the firing chamber is in close proximity to the cylinder itself, this construction may be considered preferable inasmuch as it maintains all of the combustible material at a distance from the motor itself. The firing chamber provides an expansion space 61' for the gases. It will be apparent, however, that such a structure permits a considerable loss of heat while travelling from the firing chamber to the housing 19, so that the gases when they enter the cylinder itself are at a lower temperature and therefore a correspondingly lower pressure.

In Figures 6, 7 and 8 there is illustrated a multiple pressure producing means generally similar to the means before described with the exception that there is provided a series of firing chambers 63 each containing a charge 64 and each having an individual firing pin 65. The firing pins may be operated in any desired sequence by a suitable hammer 66 carried by a rotatable cap 67, the cap carrying spring pressed means 68 for insuring proper registration of the hammer and firing pin. A flange 69 on the cap protects all of the firing pins except the one directly under the hammer and thereby prevents the simultaneous firing of a plurality of charges. The composite firing chamber has an outlet connection 70 adapted to connect to the motor through a suitable pipe 71. In accordance with the characteristics of the charge, the outlet connection may either be provided with a suitable screen 72, or such screen may be completely eliminated as before described. At such time as the cap 67 is rotated to bring the hammer 68 in registration with one of the firing pins, a rotatable valve 73 is actuated to connect the operative firing chamber to the outlet connection and to cut off the remaining firing chambers therefrom. This arrangement makes it possible to fire a series of charges in rapid succession where such an operation is desired.

In Figure 9 there is illustrated a slightly different type of charge characterized by a so-called electric match 74 having leads 75 and 76 therefrom adapted to be joined to a suitable circuit for effecting ignition of the electric match.

With combustible mixtures of the character such as now available, there is a tendency toward moisture generation during combustion. If this moisture were permitted to remain within the system, it would seriously interfere with the proper burning of a subsequent charge particularly under conditions of operation in which the charge is propelled to a point adjacent the motor itself and at which point it burns. For this reason, an automatic exhaust system of the general character herein referred to is particularly desirable. The conditions under which the present apparatus operates are such that, as before stated, moisture in liquid form is never present in the apparatus. When the charge is fired into the combustion chamber, the temperature generated is so high that the skin of the metal of the parts is heated to a very considerable degree and much above the boiling point of water. The complete cycle of normal operation requires only about one and one-half seconds, and more than half of this time is consumed in the building up of the temperature and pressure to the maximum degree. Consequently, the exhaust period consumes only about one-half second and the skin of the metal can not cool in this short time to a point below the boiling point of water. As a result any moisture existing in the system exists always in the form of superheated steam and is exhausted in that form.

The present invention possesses the many advantages of high starting torque with a compact and extremely light motor. The system including the motor is also of such characteristics as to enable it to be easily added to standard structures where it is desired to use the same for starting purposes, and enables it to be set up as an independent unit where the motor is to serve itself as a prime mover.

In Figure 10 there is illustrated a slightly different embodiment of the invention. In this figure there is shown a breech mechanism particularly effective for containing the shell which furnishes the operating pressure for the motor. The breech mechanism has its outlet port connected through a conductor 81 to the inlet and pressure chamber 82 of a starting motor 83 which is shown in assembled relationship to an internal combustion engine 84 which is to be started. The inlet or pressure chamber 82 is shown as having an exhaust connection 85 leading to any desired point which, in case of an airplane, will be outside of the fuselage. A suitable firing circuit 86 for the breech mechanism is also diagrammatically shown.

Figure 11:
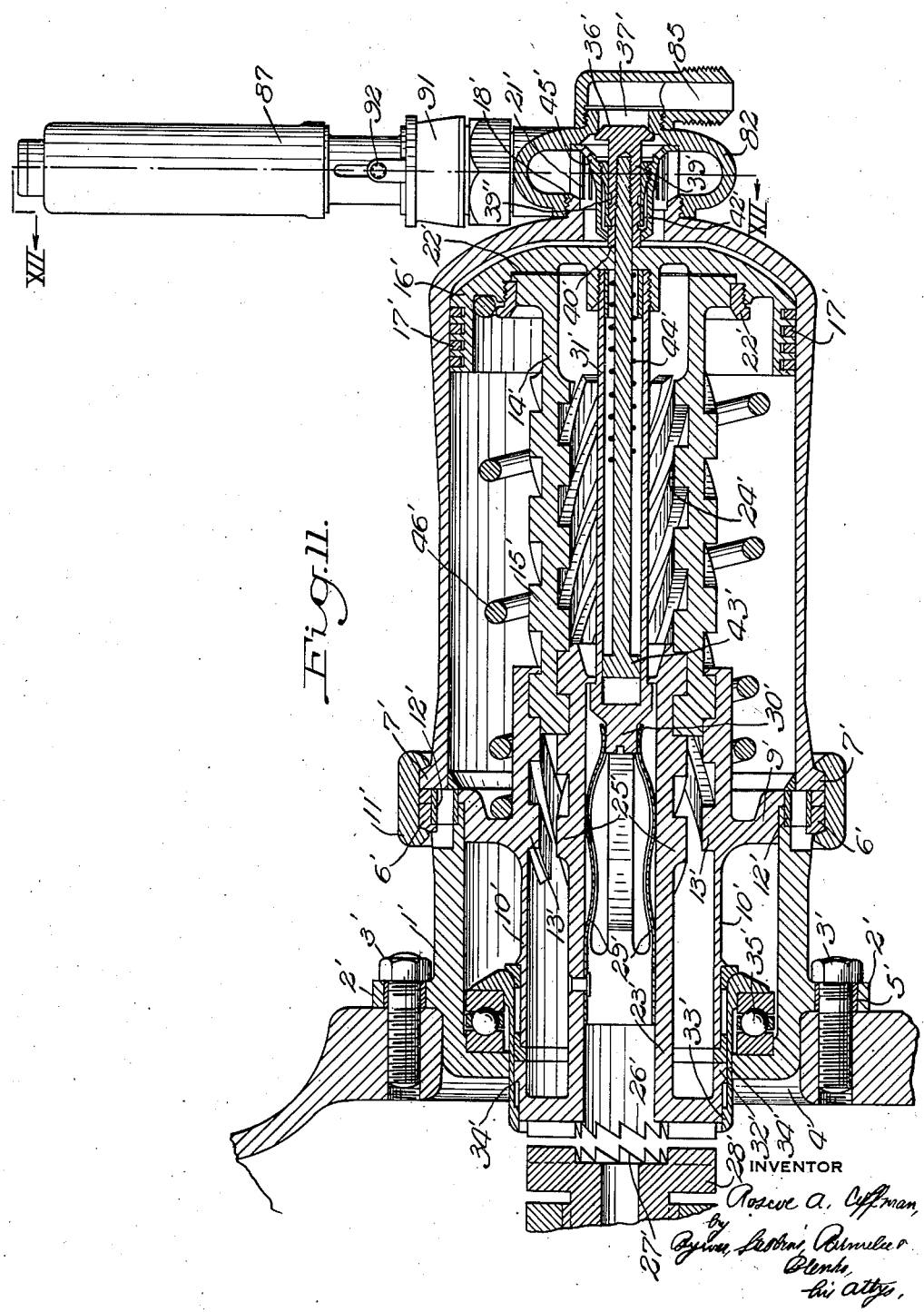
Figure 11 is a view similar to Figure 1, illustrating, however, another embodiment of the invention.
Figure 15:
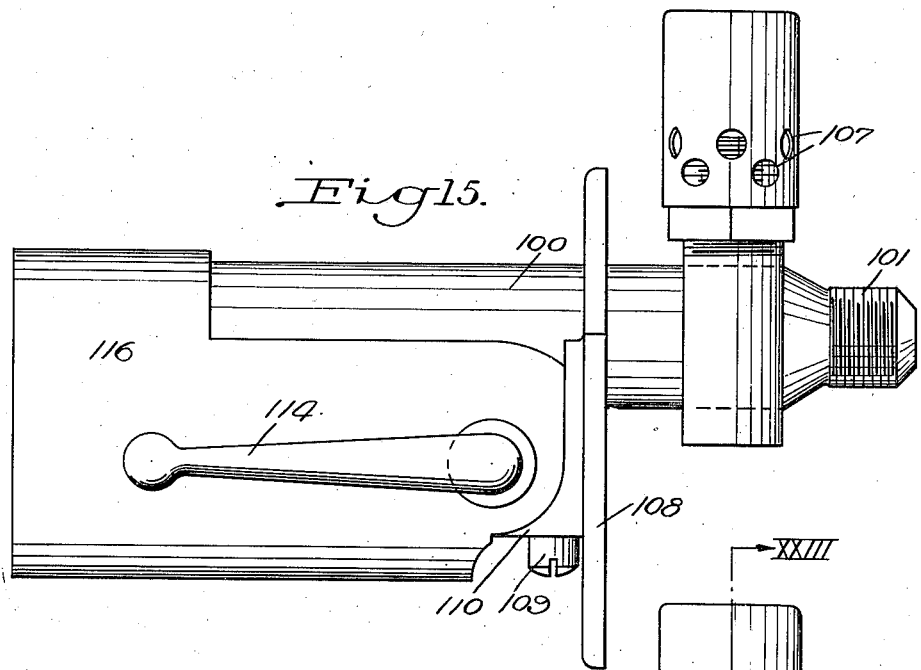
Figure 15 is a side elevational view of a form of breech mechanism such as that shown diagrammatically in Figure 10.
Figure 16:
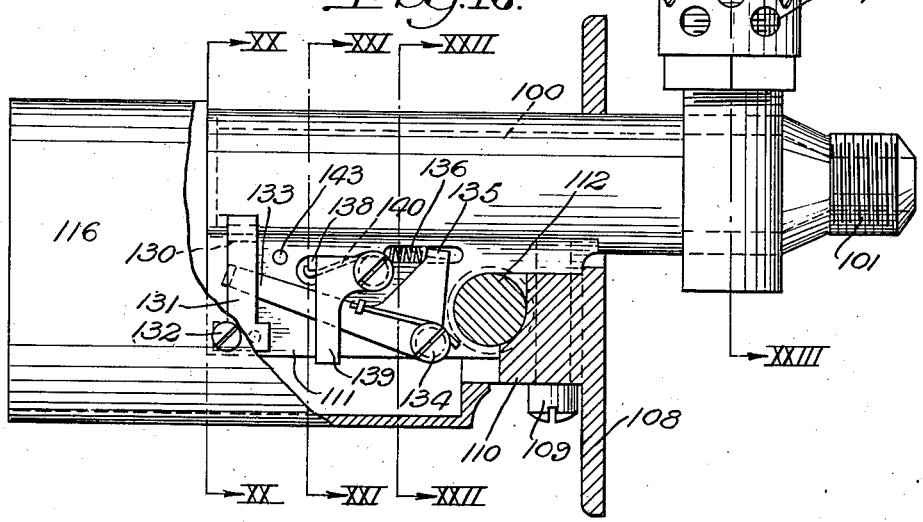
Figure 16 is a view similar to Figure 15, illustrating certain of the parts broken away and certain of the parts in section.

In Figure 11 there is illustrated in detail section a starting motor of the character shown in outline in Figure 10. This starting motor is generally of the construction illustrated in detail in Figure 1 and parts corresponding thereto are designated by the same reference characters having a prime affixed thereto. In addition to certain detail features of construction, the starting motor differs from the form of Figure 1 principally with respect to the inlet or pressure chamber 82 and with respect to both the exhaust valve mechanism and the safety mechanism 87. The exhaust is automatically effected through the medium of an exhaust valve 36' cooperating with an exhaust port 37' leading to the exhaust connection 85. The valve 36' is carried by a stem 39' of such length that with the piston in its extreme position of Figure 11, a shoulder 40' on the stem will bear against the piston whereby the piston itself assists in maintaining the exhaust valve tightly against its seat. This seating is further assisted by means of spring fingers 42' on the cage 45', the ends of the fingers being shaped to cooperate with recesses 39'' so located that with the fingers in one of the grooves the valve will be held wide open, while with the fingers in the other groove (see Figure 24) the valve will be in closed position.

The pressure chamber 82 communicates directly with the safety device 87 which is effective in case of excessive pressures, of dissipating the same and protecting the motor against injury. This is illustrated in greater detail in Figure 12 as comprising a plunger 88 operative within a cylinder 89 provided with exhaust ports 90 normally closed by a sleeve valve 91. Upon the existence of pressure within the chamber 82, the plunger 88 will be gradually raised. Should the pressure become excessive, the plunger will be raised to such an extent as to lift the sleeve 91 through the medium of a cross beam 92, and uncover the exhaust ports 90. The upward movement of the plunger 88 is restricted or retarded to the desired extent by means of a tension spring 93 of such strength as to yield only under abnormal pressure conditions.

In many cases during my sub-zero experimentations, and particularly at temperatures ranging around 20° below zero, I have found that powder may be conveyed directly to the chamber 82 without complete burning thereof, and that such unburned powder may be ignited upon a subsequent operation, thereby producing too great a volume of gases and consequently too high a pressure. In such case injury to the apparatus is precluded by the safety device just described.

In Figures 13 and 14 there is shown a slightly modified form of safety release. In these figures the pressure chamber 82' is shown as having a pressure supply connection 94 by means of which the compressed fluid or pressure forming material is delivered to the chamber 82'. This chamber has an outlet connection 95 through which the exhaust normally occurs, the outlet connection 95 communicating to a main exhaust line 96. The exhaust line 96 is, however, directly connected to the pressure chamber 82' by means of suitable couplings 97, free communication being precluded by a rupturable disk 98. In case of excessive pressure, the disk 98 will be ruptured, and the exhaust will take place directly from the chamber 82' into the line 96, thereby preventing injury to the motor or its associated parts.

In Figures 15 to 23, both inclusive, there is illustrated an improved form of breech or firing mechanism adapted to be utilized in lieu of that heretofore described. This mechanism comprises a shell chamber 100 of substantially cylindrical form adapted to receive the combustible pressure supplying charge. At its outlet end the chamber 100 is provided with a threaded extension 101 connected to the conduit 81 shown in Figure 10 and effective for transmitting the desired pressure to the pressure and burning chamber which communicates with the cylinder. The chamber 100 is likewise formed with a laterally extending port 102 communicating with a cylinder 103 as illustrated in detail in Figure 23. This cylinder is provided with a plunger 104 formed at its upper end with a valve 105. In the event of excessive pressure in the chamber 100, this pressure will be effective against the under-side of the valve 105 for raising the same against the resistance of a spring 106 and thereby opening the cylinder 103 to atmospheric exhaust through ports 107. This precludes the generation of a dangerous pressure condition within the firing chamber.

Extending around the chamber 100 is an attaching flange 108, illustrated in detail in Figure 18, adapted to be secured to the firing chamber by means of a bolt 109 extending through a boss 110 on the flange. Extending in alinement with the boss 110 is a lateral extension 111 projecting from the lower wall of the firing chamber. The projection 111 and the boss 110 are shaped at their adjacent ends to provide a bearing for a breech locking bolt 112 which carries an actuating handle 114. This locking bolt adjacent its end portions provides journals 115 for a breech closure 116 adapted to be swung upwardly into the full line positions of Figures 15 to 18 both inclusive, or downwardly to permit access to the chamber 100. When in its down position a shell as hereinafter described is inserted into the firing chamber. Such a shell is indicated in dotted lines in Figure 18. Thereafter the handle 114 is swung downwardly in a counter-clockwise direction to the position shown in Figure 15, thereby swinging the bolt 112 in a clockwise direction as viewed in Figure 18.

This movement of the bolt 112 will cause a camming surface 117 thereon to move a locking pin 118 to the right, as viewed in Figure 18, against the action of a spring 119. The locking pin 118 is carried in the projection 111, and upon movement in the direction referred to will engage a bolt 120 and move it to the right against the action of a spring 121. In effecting this movement, the locking pin 118 will necessarily follow the bolt, thereby entering the bolt recess within the pressure closure, thus locking the breech closure to the firing chamber and precluding the possibility of accidental opening movement of the breech closure. Continued rotation of the bolt 112 will be effective through the medium of a lever 122 having a pivotal mounting 123 for swinging a firing pin slide 124 to the left as viewed in Figure 18, thereby causing corresponding movement of firing pins 125 carried thereby. These firing pins are urged forwardly with the guide 124 through the medium of springs 126.

The springs are carried on insulated mountings 127. In their out position as shown in Figure 18, they are in contacting engagement with a short circuiting plate 128. The firing pins 125 are movable through an insulating bushing 129, and are mounted in the guide 124 which is likewise of non-conducting material. The two sides of an electric circuit are connected to the mountings 127. By using a shell of special construction as hereinafter more fully described, it will be apparent that inward movement of the firing pins is thus effective for completing a firing circuit, it being impossible, however, to establish a firing circuit until after the locking pin 118 has locked the breech closure in position.

The circuit having been closed, and the shell having been fired, to produce combustion of the charge carried thereby, and the pressure having been transmitted to the starting motor for starting purposes, the breech closure may be swung to open position with safety. This is accomplished by returning the handle 114 to its full line position of Figure 18, thereby releasing the locking pin 118 with a consequent reverse movement of the bolt 120, lever 122, slide 124 and firing pin 125. Upon the initial downward movement of the breech closure, an offset 130 on a spring finger 131 attached to the breech closure as indicated at 132 gradually comes downwardly into engagement with the free end of a bell crank lever 133 (see Figure 16). This causes the bell crank lever to swing in a counter-clockwise direction about its pivotal mounting 134, thus moving a spring engaging arm 135 to the left as viewed in Figure 16 and to the right as viewed in Figure 18. This movement gradually compresses an ejecting spring 136 which bears at its opposite end against an ejector 137.

Movement of the ejector 137 at this time is prevented due to the retaining action of a pawl 138. This pawl is carried by a bell crank lever 139 normally held in its full line position of Figure 16 by a spring 140. Continued counter-clockwise rotation of the lever 133 brings the same into engagement with an offset 141 thereon, thereby swinging the bell crank lever 139 in a counter-clockwise direction about its pivotal mounting. This is effective for moving the pawl 138 downwardly out of holding engagement with the ejector 137, thereby permitting the spring 136 to expand and move the ejector to the right as viewed in Figure 18. This movement is effective through a shell engaging clip 142 for ejecting the shell. The extent of ejecting movement is limited by a pin 143 located within a slot 144 in the ejector. Continued downward movement of the breech closure 116 moves the offset 130 out of engagement with the bell crank lever 133, thereby permitting continued unrestricted downward movement of the breech closure and the insertion of a fresh shell.

In Figures 25, 26 and 27, there is illustrated a slightly modified embodiment of the structure just described, corresponding parts, however, being designated by the same reference characters having a prime affixed thereto. With this construction, when the breech closure 116' reaches the chain line position A the ejector action is started. This is caused by the engagement effected at this time between an offset 130' on the spring 131' and a projection 145 on bell crank lever 133', which causes the bell crank lever to start moving in a counter-clockwise direction. This movement causes the arm 135' to move the ejector 137'. This movement continues until the breech closure reaches the position B, at which time the offset 130' is disengaged from the bell crank lever, the ejector at this time being in its dotted position. Thereafter the breech closure may be moved to its extreme open position C, ready for the next loading operation.

In this form of the invention the firing pin 125' is mounted within an insulating sleeve 146 carried by slide 124'. The firing pin carries a binding post 147 to which one side of an electric circuit may be connected, the opposite side being connected to the housing at any desired point.

In Figures 28 and 29 there is illustrated a modified form of safety release. In these figures there is shown a pressure chamber 148 adapted to be secured in any desired manner to the starting motor cylinder, and provided with an outlet connection 149. Communicating with this connection is a rupturable disk 150 which is caused to rupture in case of excessive pressure and permit dissipation of the accumulated pressure. The disk may be renewed by removing the protective cap 151 as will be readily apparent.

In Figures 32 and 33 there is illustrated one form of shell 152 which may be utilized in accordance with the present invention. Mounted at a suitable point within the shell is an electric match 153 having a terminal 154 extending to a position directly over an opening 155 through which the firing pin before described may pass. The opposite terminal 156 leads to a point 157 exteriorly of the shell so as to be in electrical contact with the breech closure. With this construction, as soon as the firing pin engages the terminal 154 the circuit is completed and the match 153 ignited.

In Figure 34 a similar match 158 is shown more closely adjacent the extreme end of the shell. By a suitable location of the match, the point of initial combustion of the combustible charge within the shell may be controlled and varied, whereby the desired conditions may be more readily obtained. With the construction as shown in Figure 34, combustion starts substantially at the extreme outer end of the shell and gradually continues backwardly, while with the construction of Figure 32 the combustion may be initiated at a point which will cause part of the charge to be propelled through into the pressure chamber on the motor wherein combustion will be completed.

In Figures 30 and 31 there is illustrated a modified embodiment of the invention in which an electric match 160 has its terminals 161 and 162 connected to contacts 163 and 164 respectively, both located in depressions 165. The shell is formed with a centering recess 166 which precludes insertion of the same into the firing chamber except in a predetermined position. With such a shell the firing pins will be duplicated, one pin being provided for each of the contacts described.

In Figures 36 and 37 there is shown a modified embodiment of the invention with the contacts 167 located in a slot 168 into which the firing mechanism will project.

In Figures 38 and 39 the shell is shown as having a central contact 169 terminating flush with the base of the shell, the opposite contact being connected to a conducting band 170. In Figures 40 and 41 a similar construction is illustrated with the contacts 171 terminating in depressions 172, while in Figures 42 and 43 the contacts 173 terminate in a common slot 174.

Figures 44 and 45 illustrate a construction similar to that of Figures 37 and 38 with the exception that the contacts 175 project into a cavity 176.

In Figures 46 and 47 the shell is shown as having two contacts 177 both terminating flush with the base 178.

In Figures 48 and 49 there is illustrated a form of shell in which centering means is not required. This construction embodies a substantially central contact 179 with an offset contact 180 in electrical connection with a conducting ring 181.

In Figures 50 and 51 there is shown a shell similar to that of Figures 32 and 34, in which, however, the match 182 is located adjacent the base of the shell so as to be effective for ejecting substantially the entire charge prior to complete burning thereof.

In Figure 52 the match 183 is shown as located in a cavity 184 adjacent the extreme outer end of the charge 185 so as to effect a slow burning of the charge from its extreme outer end. The charge 185 comprises a preformed body of combustible material cemented to the base 186. In case the charge becomes extinguished after combustion has started, the unburned portion of the charge will be removed with the shell.

Any one of the shells herein illustrated may be utilized with the breech closures described by a simple change in the number and location of the firing pins, the construction in each case being such that accidental firing until properly engaged by the firing pin or pins is precluded.

A shell utilized in accordance with the present invention preferably comprises a casing, a base, a cap 187 and a firing pin, all of which are non-deliquescent or non-hydroscopic. The cap is preferably of a material, such as celluloid, cellophane or a nitro-cellulose or phenolic condensation product of combustible characteristics whereby it will be burned simultaneously with the burning of the charge. The charge itself preferably comprises a nitro-cellulose powder capable, when burned under conditions of the character herein described, of effecting an appreciable moisture generation. This moisture under the temperature conditions to which it is subjected is converted into super-heated steam thereby affording a valuable pressure increment utilized in the operation of the motor, the super-heated steam contributing its own partial pressure and volume to the gases formed in the process of combustion.

With all of the forms of the invention there is provided a starting system including a starting motor and a source of actuating pressure, whereby the desired actuation of the motor may be obtained. The system also provides for the location of the starting motor adjacent the internal combustion engine to be driven with the control remotely positioned with respect thereto. Ordinarily the control will be suitably mounted adjacent the operator's seat within a cockpit of an airplane, thereby permitting the pilot to start the motor while in a position adjacent the normal controls for the plane.

While I have herein illustrated and described certain preferred embodiments of my invention, it will be understood that changes in the construction and operation of the various parts may be made without departing either from the spirit of the invention or the scope of my broader claims.

I claim:

1. The herein described method of moving a part to be moved wherein the ignition of a part of the fuel is initiated at a point remote to said part to generate sufficient gas pressure to propel a major portion of the fuel together with ignited particles of fuel through a system to a burning chamber closely adjacent to said part where combustion of said major portion of the fuel is completed.

2. The herein described method of moving a part to be moved wherein the ignition of a part of the fuel is initiated at a point remote to said part to generate sufficient gas pressure to propel a major portion of the fuel through a system to a burning chamber closely adjacent to said part where combustion of said major portion of the fuel is completed.

3. In a system the combination of a non-explosive burnable charge adapted to generate propulsive gases, a cylinder, a piston in said cylinder, a burning chamber communicating with said cylinder and arranged adjacent said piston prior to its power stroke, and connecting means between the initial point of generation of the propulsive gases and the burning chamber, said charge having a predetermined rate of burning sufficient to permit the major portion thereof to be propelled from the point of ignition to the burning chamber where said major portion of the charge is burned to maintain the predetermined operating pressure in said system.

4. In a closed system the combination of a non-explosive burnable charge adapted to generate propulsive gases, a cylinder, a piston in said cylinder, a burning chamber communicating with said cylinder and arranged adjacent the piston prior to its power stroke, and a connecting conduit between the initial point of generation of the propulsive gases and the burning chamber, said charge having a predetermined rate of burning sufficient to permit, upon ignition, the major portion of the charge, together with ignited particles thereof, to be propelled to the said burning chamber where the charge is fully ignited and consumed, thereby maintaining the predetermined operating pressure in said system.

5. The combination in a closed system for moving a part to be moved comprising a cylinder housing, breech mechanism, an annular burning chamber communicating with and adjacent said cylinder housing, connecting means between the breech mechanism and the burning chamber, and means for introducing ignited fuel pellets within the burning chamber in pellet form and without appreciable breakage to permit said pellets to burn within said chamber at a desired rate of consumption.

6. The combination in a closed system for moving a part to be moved comprising a cylinder housing, breech mechanism, a burning chamber communicating with and adjacent said cylinder housing, a connecting conduit between the breech mechanism and the burning chamber, and means for introducing ignited fuel pellets within the chamber at a tangent to the inner wall of said chamber and without appreciable breakage to permit said pellets to burn within said chamber at a desired rate of consumption.

7. The herein described method of producing energy to create and maintain pressure upon a part to be moved thereby, which consists of burning a charge of non-explosive combustible fuel in a closed system wherein the quantity of said charge is based upon the predetermined relationship between the instantaneous capacity of said system under normal conditions, and the rate of pressure increase due to gas formation maintained therein substantially throughout the entire movement of said part by the burning of the charge.

8. The herein described method of producing energy to create and maintain pressure upon a part to be moved thereby, which consists of burning a charge of non-explosive combustible fuel in a closed system wherein the quantity of said charge is based upon the predetermined relationship between the instantaneous capacity of said system under normal conditions, and the rate of pressure increase due to gas formation maintained therein substantially throughout the entire movement of said part by the burning of the major portion of the charge at a point in close proximity to the part to be moved.

9. The herein described method of generating and applying pressure to a part to be moved which consists of igniting a first charge, utilizing the heat from said first charge to ignite a second charge, and utilizing the heat from said second charge to ignite part of a third charge of a deflagrating but non-explosive fuel, and utilizing the gases generated to propel the balance of the third charge to a combustion chamber adjacent the part to be moved and there burning said charge, thereby utilizing heat of the gases developed by the burning of said third charge to maintain expansion of said gases at a point in close proximity to the part to be moved.

10. The herein described method of generating and applying pressure to a part to be moved which consists of igniting a deflagrating but non-explosive charge at one point, said charge comprising slow burning constituents and fast burning constituents, utilizing the pressure generated to propel a part of said charge to a combustion chamber adjacent the part to be moved and there burning said charge, said slow burning constituents maintaining the heat and pressure initially built up by the fast burning constituents for performing the desired work operation.

11. The combination in a system for moving a part to be moved comprising a cylinder, breech mechanism, and an annular burning chamber adjacent said cylinder into which ignited fuel pellets are propelled and introduced in pellet form within the chamber at a tangent, whereby a whirling movement is imparted to such fuel pellets, and the pellets maintained in ignited condition to burn within said chamber at a desired rate of consumption.

12. The herein described method of moving a part to be moved which consists of burning a charge of non-explosive combustible fuel in a closed system including a burning chamber adjacent the part to be moved to thereby generate a volume of heated propulsive gases, utilizing the heat and pressure of said gases while burning the charge in said burning chamber to create and maintain pressure upon said part, and thereafter automatically scavenging all of the gases of said charge from the system and through the burning chamber while utilizing the skin heat of the metal parts of said system to maintain said gases at a temperature above that of condensation.

ROSCOE A. COFFMAN.